(12) United States Patent
Hameed et al.

(10) Patent No.: US 8,719,478 B2
(45) Date of Patent: May 6, 2014

(54) DEADLOCK PREVENTION

(75) Inventors: Sohail Hameed, Houston, TX (US);
Balaji Natrajan, Spring, TX (US);
Lijun Qin, College Station, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 13/207,839

(22) Filed: Aug. 11, 2011

(65) Prior Publication Data

US 2013/0042039 A1 Feb. 14, 2013

(51) Int. Cl.
*G06F 12/14* (2006.01)

(52) U.S. Cl.
USPC .......................................................... 710/200

(58) Field of Classification Search
USPC .......................................................... 710/200
See application file for complete search history.

(56) References Cited

U.S. PATENT DOCUMENTS

| | | | |
|---|---|---|---|
| 5,644,768 A * | 7/1997 | Periwal et al. | 718/102 |
| 6,519,623 B1 | 2/2003 | Mancisidor | |
| 7,130,905 B2 | 10/2006 | Dinker et al. | |
| 7,788,668 B2 | 8/2010 | Barker | |
| 2008/0168458 A1* | 7/2008 | Fachan et al. | 718/104 |
| 2008/0195616 A1* | 8/2008 | Rowley | 707/8 |
| 2009/0265352 A1 | 10/2009 | Holenstein et al. | |
| 2010/0031269 A1* | 2/2010 | Fontenot et al. | 718/107 |
| 2010/0138685 A1 | 6/2010 | Kass | |
| 2011/0154368 A1* | 6/2011 | Banks et al. | 719/316 |

* cited by examiner

*Primary Examiner* — Nimesh G Patel (57) ABSTRACT

Methods, systems, and computer-readable media with executable instructions stored thereon for preventing deadlocks are provided. An inter-device mutex (IDM) can be locked for a first client. An error message can be sent to a second client in response to a received first lock command from the second client while the IDM is locked for the first client. A number of second lock commands from the second client while the IDM is locked for the first client can be received. The IDM can be unlocked for the first client in response to an unlock command received from the first client. The IDM can be locked for the second client in response to a received third lock command from the second client, wherein the third lock command is received subsequent to unlocking the IDM for the first client.

13 Claims, 4 Drawing Sheets

DEADLOCK PREVENTION

BACKGROUND

Computing devices can include complex firmware that runs an embedded operating system. Such computing devices are often called upon to run multiple processes collaboratively to perform a task. Further, these types of computing devices can share a number of resources and critical sections of code that need to be protected in order to perform a task. Complex systems can include two computing devices connected via an inter-device link where the two computing devices communicate and share critical sections of code.

DETAILED DESCRIPTION

Examples of the present disclosure include methods, systems, and computer-readable media with executable instructions stored thereon for preventing deadlocks. An inter-device mutex (IDM) can be locked for a first client. An error message can be sent to a second client in response to a received first lock command from the second client while the IDM is locked for the first client. A number of second lock commands from the second client while the IDM is locked for the first client can be received. The IDM can be unlocked for the first client in response to an unlock command received from the first client. The IDM can be locked for the second client in response to a received third lock command from the second client, wherein the third lock command is received subsequent to unlocking the IDM for the first client.

Computing devices with multiple processes running collaboratively to perform a task can include a semaphore or mutex to provide mutual exclusive access to critical sections of code. A semaphore restricts a number of simultaneous users of a shared resource up to a specified maximum number of users. A thread can request access to the resource and can signal that it has finished using the resource. A mutex serializes access to a section of code that cannot be executed concurrently by more than one thread. A mutex, therefore, can allow one thread at a time to access a resource, while forcing other threads to wait until the first thread has relinquished the resource. A critical section of code can include code that accesses a shared resource that cannot be concurrently accessed by more than one thread.

Computing systems can have two or more computing devices (e.g., array controllers, SAS switches, blade devices) setup in an active/active or active/standby configuration, where the two computing devices can be connected to one another via an inter-device link and different processes running on each device can communicate with each other. An active/active configuration can include a configuration in which traffic intended for a computing device that has failed is either passed onto an existing computing device or load balanced across the remaining device. Active/Active configuration can be typical with computing devices of homogeneous software configuration. An active/standby configuration can provide a redundant instance of each device, where the standby device (e.g., redundant device) is brought online when the active device fails. Mutexes employed in two or more computing device systems can be computing device specific. That is, a mutex can have an operating system scope defined in the computing realm of a computing device in which the mutex is defined. As a result, computing device specific mutexes are not visible or effective between two devices and therefore can be ineffective between multiple devices.

In the present disclosure, reference is made to the accompanying drawings that form a part hereof, and in which is shown by way of illustration how one or more examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit of a three digit number corresponds to the drawing figure number and the remaining digits identify an element or component in the drawing. Similar elements or components between different figures can be identified by the use of similar digits. For example, 224 can reference element "24" in FIG. 2, and a similar element can be referenced as 324 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
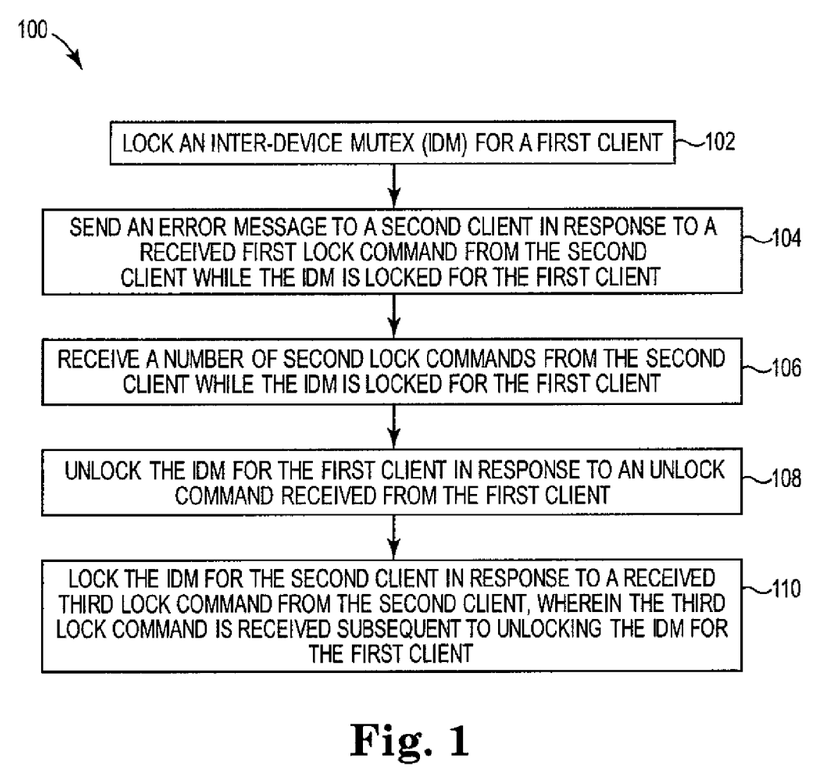
FIG. 1 illustrates a flow chart of an example of a method for preventing deadlocks according to the present disclosure.

FIG. 1 illustrates a flow chart of a method 100 for preventing deadlocks according to the present disclosure. A deadlock can be, for example, a situation where two or more competing actions are each waiting for the other to finish. In an example, a deadlock can be when two or more processes are each waiting for the other to release a resource. That is, the two or more processes are waiting for resources in a circular chain. An inter-device mutex is locked for a first client, at 102. An inter-device mutex can be a mutex in communication with a number of devices. In an example, a device can be a computing device including a computer-readable medium as described herein. A device can include, but is not limited to, an array controller, a serial attached small computer system interface (SAS), a blade device, etc. An IDM can be locked, for example, when the IDM negotiates mutual exclusion among threads. A thread can be a unit of processing that can be scheduled by an operating system. In an example a thread can request a resource. In one or more examples, the resource is a critical section. A critical section can be a piece of code that cannot be concurrently accessed by more than one thread. A client can be on, for example, a device as described herein. A client is a service requester in client-Server model of computing. A client can be either local or remote. A local client can be a client that connects to the Server running on the same device and sends the commands to it. A remote client can be a client that connects to the Server running on a remote device.

In an example, a lock command can be received from the first client to lock the IDM. Locking the IDM for a first client can include determining if the client is local to the IDM. A client can be local to the IDM when, for example, the IDM and the client are on the same device. In an example, the first device includes the first client. The IDM, in an example, can be included in the first device. A non-local client can be created in response to determining the server being addressed is not local. Locking the IDM can include determining if the client has context information. Context information can include, but is not limited to, the process id, the thread id, and/or the device id of the device trying to lock the mutex. If the client is not local and does not have context information, context information can be created for the client. If the context information is passed at the time of creation of a command, the same context information can be used to create the command. In an example, the context information is created by assigning a command a process id, a thread id, and/or a device id from the originating device, etc. The created context information can be associated with the IDM and the client for which it was created.

The lock command from the first client can, in an example, include context information. The context information within the lock command of the first client can be associated with the locked IDM. In an example, locking the IDM increases a reference count by one. Reference counting is a technique used to store a number of references to a resource such as, for example, an object, block of memory, disk space, etc. Reference counting can be used to track, for example, if a resource is locked, if a resource is unlocked, how many times a resource has been locked, etc. In an example, a resource can be locked when the reference count of the resource is zero. A resource can be double-locked when the reference count is one. A resource can be double-unlocked when, for example, the resource has a reference count of two and the resource can be unlocked when the resource has a reference count of one. An unlocked resource can be a resource with a reference count of zero.

An error message is sent to a second client in response to a received first lock command from the second client while the IDM is locked for the first client, at 104. The second client can, for example, be on a different device than the first client. The first lock command received from the second client can contain context information of the second client. The context information of the second client can, for example, be different than the context information of the first client, which is associated with the already locked IDM. An error message is information displayed when an unexpected condition occurs (e.g., inability to lock the IDM). In an example, the second client goes into a wait cycle in response to the error message. A wait cycle, for example, can include a repetitious series of lock commands sent to the IDM. In one or more examples, a wait cycle can include a time period in which the second client waits before sending a subsequent second lock command. A number of second lock commands are received from the second client while the IDM is locked for the first client, at 106. Each second lock command can include the context information of the second client.

In an example, a separate IDM can be used for each of the resources in a system or for each of the set of resources in the system. The IDM locked by the first client can grant access to a number of resources on the first device for use by the first client. In an example, each resource of the number of resources can be related to one another. A resource includes a physical or virtual component of limited availability within a computing system. The first number of accessed resources can be associated with the first client, for example, for use in a process. Accessing the number of resources can include creating a number of remote clients. Creating a remote client includes, but is not limited to, establishing a client connected to a Server of the remote device. A double-lock command can, in an example, be received from the first client. The double-lock command can include the context information of the first client which can be received from the first client as part of the command. In response to the double-lock command containing the same context information associated with the locked IDM, the IDM can be double-locked by the remote client. In an example, double-locking the IDM can include granting access to a first number of resources to the remote device. In an example, double-locking the IDM increases a reference count by one.

A double-unlock command can be received from the remote client after, for example, the accessed first number of resources are no longer needed for processing by the remote client. The double-unlock command can include the context information of the first client that is associated with the double-locked IDM. In response to the double-unlock command, the IDM can be double-unlocked and the second number of resources can be disassociated with the IDM. Double-unlocking the IDM, in an example, can decrease a reference count of the IDM by one. In an example, the IDM can be considered unlocked when the reference count drops to zero. For example, after double unlocking the reference count will still be non-zero, since the first client still has the first number of resources locked, and the IDM cannot be considered unlocked.

At 108, an unlock command from the first client is received and in response to the command the IDM is unlocked for the first client. In an example the unlock command from the first client includes the context information of the first client. The context information of the first client is the same context information associated with the locked IDM. Unlocking the IDM for the first client can, for example, include disassociating the first number of resources. In an example, unlocking the IDM can include decreasing a reference count by one. The IDM is locked for the second client in response to a received third lock command from the second client, wherein the third lock command is received subsequent to unlocking the IDM for the first client, at 116. The IDM is locked for the second client in response to the third lock command.

Figure 2:
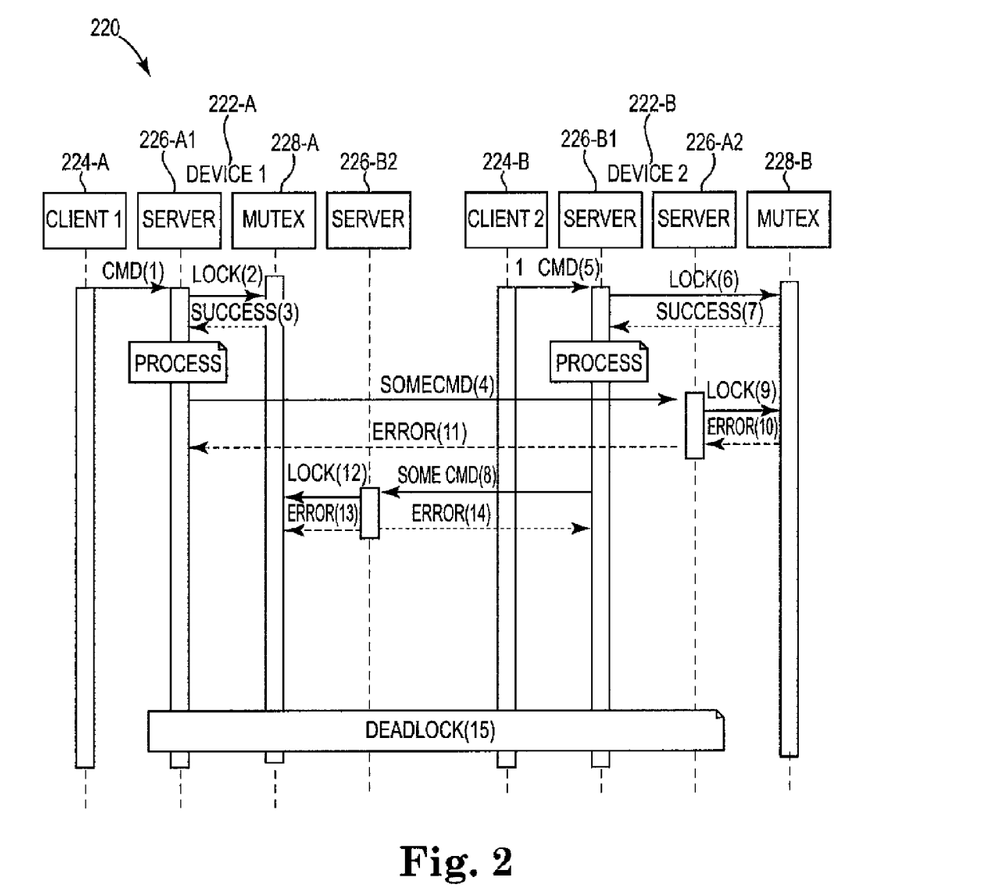
FIG. 2 illustrates a block diagram of an example of a deadlock situation.

FIG. 2 illustrates a block diagram of an example of a deadlock situation 220. Time increases moving down the figure. A client 224 sends a command, cmd(1), to the Server 226-A1 running on the same device 222-A. As illustrated in FIG. 2, client 224-A is a local client because it is on the same device as the server 226-A1. When the Server 226-A1 receives the command, it can start processing the command, in which case, no other commands will be accepted until the Server 226-A1 is done processing the command and starts listening to a channel depending upon the nature of the connection. A channel can, for example, be a socket in the case of a TCP/IP interface. In an example, the Server 226-A1 can spawn another thread to handle the command and the main thread can go back to listening for the new incoming commands.

While Server 226-A1 is processing the command, it reaches a critical section of code and it sends a lock command, Lock(2), to lock a mutex 228-A. In FIG. 2, mutex 228-A is available so it is able to be locked successfully, success(3). The command is such that the Server 226-A1 needs to gather some additional information from the remote device 226-B, someCmd(4). Server 226-A1 can create a remote client that sends a command to the Server 226-A2 on the other device 222-B.

In the meantime, Client 224-B on device 2, 222-B sends a command, cmd(5), to the Server 226-B1 on device 2, 222-B before the Server 226-A1 sends a command to Server 226-A2, someCmd(4). Server 226-B1 sends a lock command, Lock(6), to lock the mutex 228-B on device 2, 222-B. Mutex 228-B is different from mutex 228-A and they reside on two different devices, device 1, 222-A and device 2, 222-B. Mutex 228-B is not already locked, so it is able to be locked, success(7). The command, someCmd(4), sent by Server 226-A1 on device 1, 222-A reaches Server 226-A2 running on device 2, 222-B. Server 226-A2 is not able to lock, Lock(9), mutex 228-B since it has already been acquired by Server 226-B1 and Server 226-A2 gets an error back, error(10). Server 226-A2 returns an error back to Server 226-A1, error (11). While processing the command, cmd(5), 226-B1 determines that it needs more information from device 1, 222-A, and 226-B1 sends a command, someCmd(8), to device 1, 222-A. Somecomd(8) results in the creation of another Server, Server 226-B2, on device 1, 222-A. Server 226-B2 is not able to lock, Lock(12), the mutex 228-A since Server 226-A1 has already acquired it and Server 226-B2 gets an error back, error(13). Server 226-B2 returns an error back to Server 226-B1, error(14). Both Server 226-B1 and Server 226-A1 have received errors and they can either retry the command or block for their respective mutexes to be unlocked. If they block a deadlock, Deadlock(15), condition arises. If the Servers retry, the same scenario will repeat itself and there will still be a deadlock condition in the system, sometimes referred to as livelock. That is, there is a cyclic dependency between Server 226-A1 and Server 226-B1 because they are using two independent, computing device specific mutexes, 228-A and 228-B.

Figure 3:
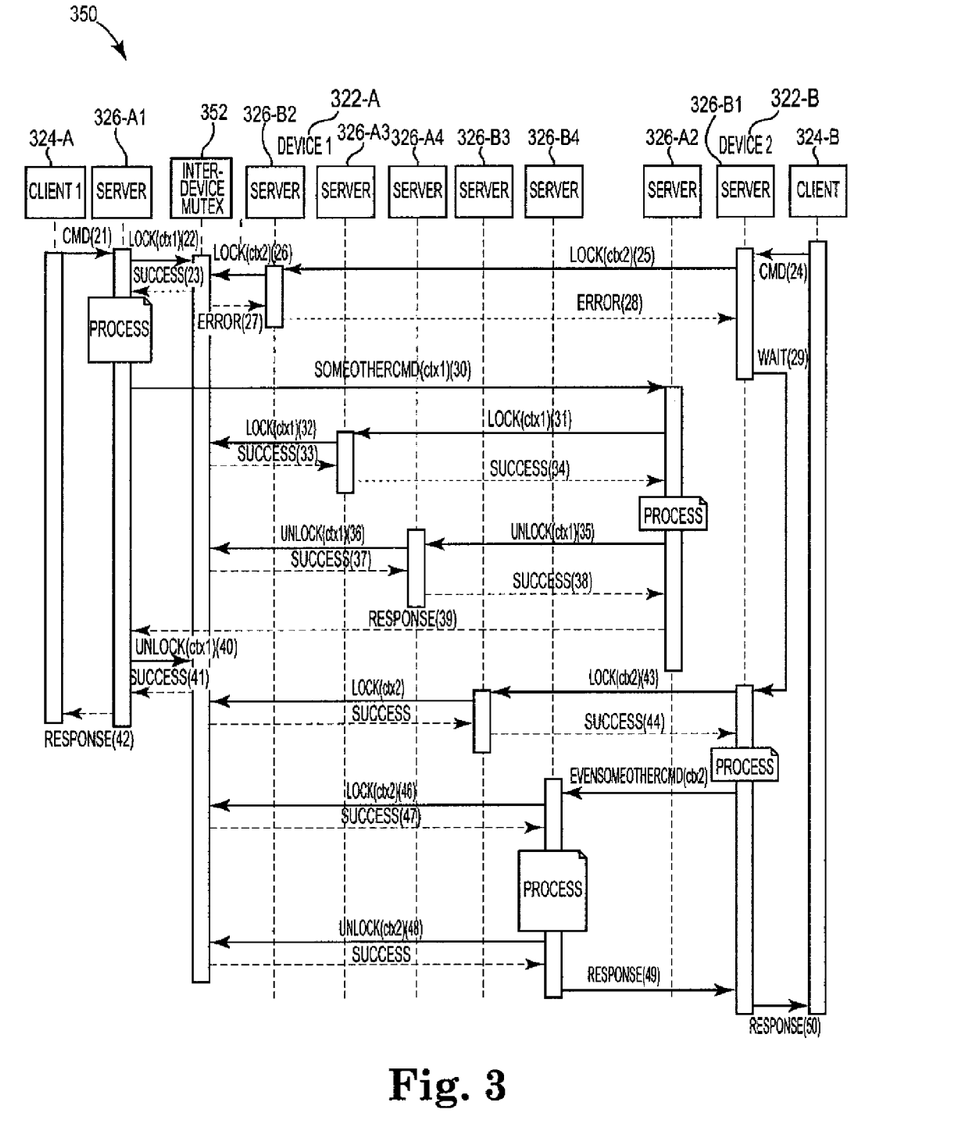
FIG. 3 illustrates a block diagram of an example of deadlock prevention according to the present disclosure.

FIG. 3 illustrates a block diagram of an example of deadlock prevention 350 according to the present disclosure. Time increases moving down the figure. Client 324-A on device 1, 322-A sends a command, cmd(21), to Server 326-A1 with empty context. In FIG. 3, inter-device mutex (IDM) 352 is located on device 1, 322-A1. When Server 326-A1 sees that the context is empty, it uses the local context ctx1. The Server 326-A1 tries to lock the IDM 352 using context ctx1, Lock (ctx1)(22), and it succeeds, success(23). While Server 326-A1 tries to lock the IDM 352 the client 324-B sends a command, cmd(24), to Server 326-B1 on device 322-B with empty context. Server 326-B1, upon seeing the empty context, generates its local context ctx2. Since the IDM 352 is on device 1, 322-A, the Server 326-B1 sends a remote command to Server 326-B2 to lock the IDM 352 using context ctx2, Lock(ctx2)(25). Server 326-B2 then sends the lock command, Lock(ctx2)(26), to the IDM 352. The Server 326-B2 gets an error back, error(26) since the IDM 352 is already locked by Server 326-A1 with context ctx1 and returns it back to Server 326-B1, error(8). Upon receiving the error, error (28), the Server 326-B1 goes into a "wait" cycle, Wait(29), so that it can try to lock the IDM 352 later.

At device 1, 322-A, Server 326-A1 does some processing and then sends a command, someOtherCmd(ctx1)(30), to the remote device 2, 322-B to gather some more information. In an example, Server 326-A1 can create a remote client and send the command over to Server 326-A2 in device 2, 322-B and pass the context ctx1, the context in which it is currently operating, with the command. Server 326-A2 tries to lock the IDM 352 and since the IDM 352 is on device 1, 322-A, it sends a command back to Server 326-A3 on device 1 to double-lock the IDM 352 using the context ctx1, Lock(ctx1) (31). The Server 326-A3 in turn tries to double-lock, Lock (ctx1)(32), the IDM 352 and it succeeds, success(33), since last time DM 352 was locked with the same context ctx1. In an example, the reference count of IDM 352 is now two since it has been locked twice, and hence it must be unlocked twice before it is truly released. Server 326-A3 returns success, success(34), to Server 326-A2 which then processes the command and double-unlocks the IDM 352 by sending a double-unlock command, Unlock(ctx1)(35), command over to Server 326-A4 using the same context ctx1 which in turn double-unlocks, Unlock(ctx1)(36), the IDM 352 decrementing the reference count, in an example, to one. Server 326-A3 receives a success, success(37), which in turn is sent, success (38), to Server 326-A2. Server 326-A2 then sends the response, response(39), back to Server 326-A1, which finishes the processing and unlocks, Unlock(ctx1)(40), the IDM 352 using context ctx1. In an example, Server 326-A1 unlocks the IDM 352 dropping the reference count to zero. Server 326-A1 succeeds, success(41), because the lock was associated with the context ctx1 and Server 326-A1 sends a response, response(42), to client 1, 324-A.

Server 326-B1 has been waiting for the IDM 352 to be available. It can, in an example, re-attempt to lock the IDM 352 but it would continue to get the errors back until the IDM 352 is truly unlocked when, for example, its reference count drops down to zero. After IDM 352 is unlocked the next attempt to lock the IDM 352 with its context ctx2, Lock(ctx2) (43), would succeed, success(44). After the successful lock the Server 326-B1 processes the command, and sends another command, evenSomeOtherCmd(ctx2)(44), over to Server 326-B4 with context ctx2 on device 1, 326-A1, to gather some more information. Server 326-B4 in turn tries to double-lock, Lock(ctx2)(46), the IDM 352 with context ctx2 and succeeds, success(47), since now IDM 352 is not locked by a different context. Server 326-B4 then processes the command, double-unlocks, Unlock(ctx2)(48), the IDM 352, returns the response, response(49), back to Server 326-B1, which in turn returns the response, response(50), back to client 324-B. In an example, the double-unlock command can succeed in both double-unlocking and unlocking the IDM. That is, the reference count can be reduced from two to zero if the double-unlock command is of the same context associated with the double-locked IDM. By allowing each command originating on the two devices to execute in turn and requiring communication between the devices a deadlock condition can be avoided.

Examples of the present disclosure include methods, systems, and computer-readable media with executable instructions stored thereon for preventing deadlocks. Computing systems of two or more computing devices can include a number of mutexes for each computing device of the computing system. Such computing device specific mutexes are not visible to one another and can result in deadlock situations. Examples of the present disclosure include an IDM that is visible between computing devices and permits communication between processes running on two or more computing devices. The IDM of the present disclosure can protect shared resources of the two or more computing devices while allowing the processes of the two or more computing devices to be completed. Deadlocks can cause system freezing and long downtimes. Deadlock prevention can save on lost time due to downtime and consequently save money in revitalizing a locked system.

Figure 4:
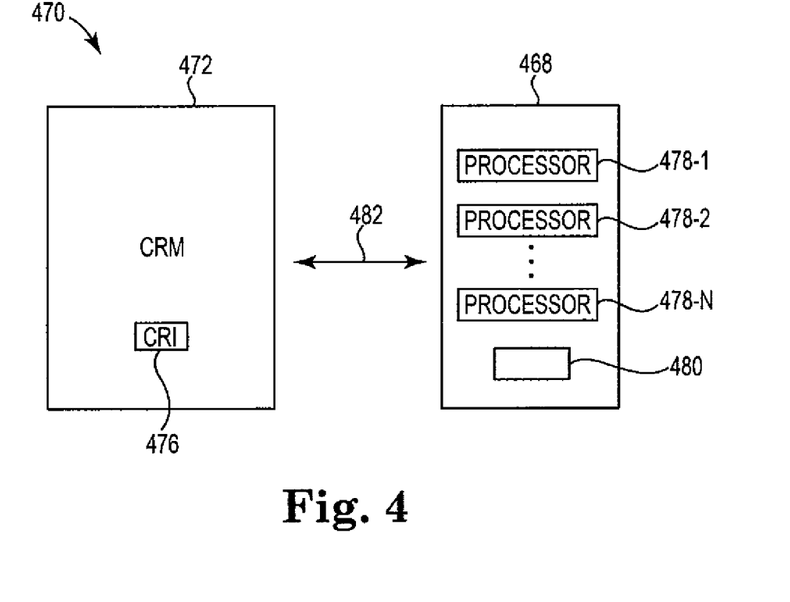
FIG. 4 illustrates a block diagram of an example of a computer-readable medium in communication with processing resources for Configuration Management Database security according to the present disclosure.

FIG. 4 illustrates a block diagram 470 of an example of a computer-readable medium in communication with processing resources for preventing deadlocks according to the present disclosure. Computer-readable medium (CRM) 472 can be in communication with a computing device 468 (e.g., Java application server) having one or more processors of more or fewer than 478-1, 478-2, . . . ,478-N, that can be in communication with, and/or receive a tangible non-transitory CRM 472 storing a set of computer-readable instructions 476 executable by one or more of the processors (e.g., 478-1, 478-2, . . . ,478-N) for deadlock prevention. Computer-readable instructions can, for example, include read/write data.

The computing device 474 may include memory resources 480, and the processors 478-1, 478-2, . . . ,478-N may be coupled to the memory resources 480.

Processors that can execute computer-readable instructions 476 for preventing deadlocks are stored on an internal or external non-transitory computer-readable medium 472. A non-transitory computer-readable medium (e.g., computer readable medium 472), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), flash memory, etc., as well as other types of CRM.

The non-transitory computer-readable 472 medium can be integral, or communicatively coupled, to a computing device, in either in a wired or wireless manner. For example, the non-transitory CRM can be an internal memory, a portable memory, a portable disk, or a memory located internal to another computing resource (e.g., enabling the computer-readable instructions to be downloaded over the Internet).

The CRM 472 can be in communication with the processors (e.g., 478-1, 478-2, . . . ,478-N) via a communication path 482. The communication path 482 can be local or remote to a machine associated with the processors 478-1, 478-2, . . . , 478-N. Examples of a local communication path 482 can include an electronic bus internal to a machine such as a computer where the CRM 472 is one of volatile, non-volatile, fixed, and/or removable storage medium in communication with the processors (e.g., 478-1, 478-2, . . . ,478-N) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 482 can be such that the CRM 472 is remote from the processors resources (e.g., 478-1, 478-2, . . . ,478-N) such as in the example of a network connection between the CRM 472 and the processors resources (e.g., 478-1, 478-2, . . . ,478-N). That is, the communication path 482 can be a network connection. Examples of such a network connection can include a local area network (LAN), a wide area network (WAN), a personal area network (PAN), and the Internet, among others. In such examples, the CRM 472 may be associated with a first computing device and the processors resources (e.g., 478-1, 478-2, . . . ,478-N) may be associated with a second computing device. In an example, the IDM can be located in one of the processors 478-1, 478-2, . . . ,478-N.

Processors 478-1, 478-2, . . . ,478-N coupled to the memory 480 can receive a lock command from a first device, where the lock command includes context information of the first device. In response, the processor resources 478-1, 478-2, . . . , 478-N can lock an inter-device mutex (IDM) for the first device and a reference count is increased by one. A first lock command from a second device to lock the IDM while the IDM is locked for the first client can be received, where the first lock command includes a context information of the second device. In response to the first lock command, an error message can be sent to the second device. The processor resources 478-1, 478-2, . . . ,478-N can receive a number of second lock commands from the second device while the IDM is locked for the first client, and each time the second lock commands can be returned with error. In an example, a third device can send a lock command to the IDM already locked by the first device. If the third device has the same context information of the first device that locked the IDM the IDM can be locked by the third device. For example, the first device can send a command to the third device, wherein the command includes context information. The third device, according to the command, then sends a lock command with the context information from the first device to the IDM. The lock command would be successful because it has the same context information. In such an example the lock command from the third device can be a double-lock command. An unlock command from the first device, including the context information of the first device can be received. The IDM can be unlocked for the first device in response to the unlock command from the first client and the reference count of the IDM can be decreased by one. Processors 478-1, 478-2, . . . ,478-N can receive a third lock command from the second device subsequent to unlocking the IDM for the first client and lock the IDM for the second device in response to the third lock command.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." The term "a number of" is meant to be understood as including at least one but not limited to one. The phrase "in an example," as used herein does not necessarily refer to the same example, although it can.

What is claimed:

1. A method for preventing deadlocks, comprising:
    locking an inter-device mutex (IDM) for a first client;
    sending an error message to a second client in response to a received first lock command from the second client while the IDM is locked for the first client;
    granting access to a first number of resources;
    associating the first number of resources with the first or second client associated with the locked IDM;

receiving a number of second lock commands from the second client while the IDM is locked for the first client;

double locking the IDM for the first or second client in response to receiving a double lock command from the first or second client, wherein the double lock command includes the same context information associated with the locked IDM, and wherin double-locking the IDM includes:
  granting access to a second number of resources; and
  associating the second number of resources with the first or second client associated with the double-locked IDM;

unlocking the IDM for the first client in response to an unlock command received from the first client; and locking the IDM for second client in response to a received third lock command from the second client, wherein the third lock command is received subsequent to the unlocking the IDM for the first client.

2. The method of claim 1, wherein locking the IDM comprises:
  determining if the first or second client is local to the IDM;
  determining if the first or second client has context information;
  creating context information for the first or second client, when the first or second client is not local and does not have context information; and
  associating the IDM with the context information of the first or second client.

3. The method of claim 1, wherein unlocking the IDM comprises:
  disassociating the first number of resources from the first or second client associated with the locked IDM; and
  relinquishing the first number of resources.

4. The method of claim 1, comprising:
  receiving a double-unlock command from the first or second client, subsequent to double-locking the IDM for the first or second client; and
  double-unlocking the IDM if the double-unlock command from the first or second client includes the same context information associated with the locked IDM.

5. The method of claim 1, comprising:
  incrementing a reference count of the IDM by one when the IDM is locked;
  incrementing the reference count of the IDM by one when the IDM is double-locked;
  decrementing the reference count of the IDM by one when the IDM is double-unlocked; and
  decrementing the reference count of the IDM by one when the IDM is unlocked.

6. The method of claim 1, wherein sending the error message comprises instructing a server associated with the second client to go into a wait cycle.

7. The method of claim 1, further comprising the second client entering a wait cycle in response to receiving the error message.

8. A non-transitory computer-readable medium comprising computer-readable instructions stored thereon that, when executed by one or more processors, cause the one or more processors to:
  send an error message to a second device in response to a received first lock command having a second device context information from the second device to lock the inter-device mutex (IDM) while the IDM is locked for a first device with a first device context information wherein the locked IDM has are ference count of one;
  grant access to a first number of resources;
  associate the first number of resources with the first or second device associated with the locked IDM;
  receive a number of second lock commands from the second device while the IDM is locked for the first device;
  receive a double-lock command from the first or second device, wherein the double lock command includes the same context information associated with the locked IDM, and wherein double-locking the IDM includes:
    granting access to a second number of resources; and
    associating the second number of resources with the first or second client associated with the double-locked IDM;
  unlock the IDM for the first device in response to a received unlock command from the first device, the unlock command from the first device including the first device context information;
  decrease the reference count of the IDM by one in response to unlocking the IDM; and
  lock the IDM for the second device in response to a received third lock command from the second device subsequent to unlocking the IDM for the first device.

9. The non-transitory computer-readable medium of claim 8, comprising computer-readable instructions stored thereon that, when executed by one or more processors, cause the one or more processors to:
  receive an unlock command from the second device, the unlock command from the second device including the context information of the second device; and
  unlock the IDM for the second device in response to the unlock command.

10. The non-transitory computer-readable medium of claim 8, wherein the first device includes the IDM.

11. The non-transitory computer-readable medium of claim 8, comprising computer-readable instructions stored thereon that, when executed by one or more processors, cause the one or more processors to:
  receive a double-lock command from the first or second device, subsequent to locking the IDM for the first or second device;
  double-lock the IDM when the double-lock command from the first or second device includes the same context information associated with the locked IDM; and
  increase the reference count of the IDM by one in response to double-locking the IDM.

12. A system for preventing deadlocks during inter-device communication, comprising:
  a memory operable to store executable instructions; and
  a processor coupled to the memory, wherein the processor executes the instruction to:
    lock an inter-device mutex (IDM) for a first device in response to a received lock command including a first device context information, wherein the lock command includes a command to retrieve and associate a first number of resources;
    grant access to a first number of resources;
    associate the first number of resources with the first or second device associated with the locked IDM;
    send a first error message to a second device in response to a received first lock command having a second device context information from the second device to lock the IDM while the IDM is locked for the first device;
    receive a number of second lock commands from the second device while the IDM is locked for the first device;
    double-lock the IDM in response to a received double-lock command from the first or second device, wherein in the double lock command includes the same context information associated with the locked IDM, and wherein double-locking the IDM includes: granting access to a second number of resources; and associating the second number of resources with the first or second client associated with the double-locked IDM;

unlock the IDM for the first device in response to a received unlock command from the first device, the unlock command from the first device including the first device context information and a command to disassociate the first number of resources; and lock the IDM for the second device in response to a received third lock command from the second device subsequent to unlocking the IDM for the first device.

13. The system of claim 12, wherein the instructions to lock the IDM for the first of second device include instructions executed by the processors to:

determine if the IDM is local; and create a non-local client in response to determining the IDM is non-local.

* * * * *

UNITED STATES PATENT AND TRADEMARK OFFICE
CERTIFICATE OF CORRECTION

PATENT NO. : 8,719,478 B2  Page 1 of 1
APPLICATION NO. : 13/207839
DATED : May 6, 2014
INVENTOR(S) : Sohail Hameed et al.

It is certified that error appears in the above-identified patent and that said Letters Patent is hereby corrected as shown below:

In the Claims

In column 9, line 7, in Claim 1, delete "wherin" and insert -- wherein --, therefor.

In column 9, line 15, in Claim 1, delete "for" and insert -- for the --, therefor.

In column 9, line 17, in Claim 1, after "subsequent to" delete "the".

In column 9, line 65, in Claim 8, delete "information" and insert -- information, --, therefor.

In column 9, line 66, in Claim 8, delete "are ference" and insert -- a reference --, therefor.

In column 10, line 37, in Claim 11, delete "receive a" and insert -- receive the --, therefor.

In column 10, line 38, in Claim 11, delete "device," and insert -- device --, therefor.

In column 10, line 66, in Claim 12, delete "double-lock" and insert -- double lock --, therefor.

In column 11, line 1, in Claim 12, delete "wherein in" and insert -- wherein --, therefor.

Signed and Sealed this
Ninth Day of September, 2014

Michelle K. Lee
*Deputy Director of the United States Patent and Trademark Office*